(12) United States Patent
Kasperson et al.

(10) Patent No.: US 8,296,406 B2
(45) Date of Patent: Oct. 23, 2012

(54) CONFIGURABLE DEVICE REPLACEMENT

(75) Inventors: David L. Kasperson, Round Rock, TX (US); Gary D. Evans, Pflugerville, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3268 days.

(21) Appl. No.: 10/423,315

(22) Filed: Apr. 25, 2003

(65) Prior Publication Data

US 2004/0215854 A1     Oct. 28, 2004

(51) Int. Cl.
*G06F 15/177* (2006.01)
*G06F 13/00* (2006.01)
*G06F 1/24* (2006.01)
*H04L 12/50* (2006.01)

(52) U.S. Cl. ........ 709/221; 710/104; 710/316; 713/100; 370/360

(58) Field of Classification Search ............... 709/220, 709/221, 222
See application file for complete search history.

(56) References Cited

U.S. PATENT DOCUMENTS

| | | | | |
|---|---|---|---|---|
| 5,751,967 A * | 5/1998 | Raab et al. | .................... | 709/228 |
| 5,826,028 A * | 10/1998 | Bennett et al. | ................ | 709/222 |
| 5,940,376 A * | 8/1999 | Yanacek et al. | ............... | 370/250 |
| 6,128,294 A * | 10/2000 | Oura et al. | .................... | 370/389 |
| 6,415,314 B1 * | 7/2002 | Fee et al. | ....................... | 709/201 |
| 6,685,567 B2 * | 2/2004 | Cockerille et al. | .............. | 463/43 |
| 6,750,883 B1 * | 6/2004 | Parupudi et al. | .............. | 715/763 |
| 6,963,909 B1 * | 11/2005 | Huey et al. | ..................... | 709/222 |
| 2001/0054093 A1 * | 12/2001 | Iwatani | ......................... | 709/223 |
| 2002/0129230 A1 | 9/2002 | Albright et al. | | |
| 2002/0176434 A1 * | 11/2002 | Yu et al. | ........................ | 370/422 |
| 2003/0002492 A1 * | 1/2003 | Gallagher et al. | ............ | 370/360 |
| 2003/0216143 A1 * | 11/2003 | Roese et al. | ............... | 455/456.1 |
| 2005/0021684 A1 * | 1/2005 | Hsue et al. | ..................... | 709/220 |

* cited by examiner

*Primary Examiner* — Ranodhi Serrao

(57) ABSTRACT

A configurable device may be disclosed herein that is capable of multiple configurations depending on its location within a support structure. Some embodiments comprise a system that includes a configurable device located within a support structure and logic that is adapted to determine the location of the configurable device within the support structure and to inform the configurable device of its location. The configurable device may compare its location as informed by the logic to a previous location value stored in the configurable device. The configurable device may load a first configuration if the locations match or load a second configuration if the locations do not match.

12 Claims, 2 Drawing Sheets

CONFIGURABLE DEVICE REPLACEMENT

BACKGROUND

1. Field of the Invention

The present invention generally relates to replacement of configurable devices in a system.

2. Background Information

Some electronic systems include one or more replaceable components. Such components may be configurable and, as such, may have memory in which configuration information may be stored. The operation of such a component may be altered by changing the components' configuration information. A configurable component in a system generally may interact with at least one other system component (which itself may or may not be configurable). The configurable component's configuration information may dictate how the component interacts with such other components.

If a configurable component is removed and replaced by another configurable component, one or more problems may arise. For instance, the new component may be configured differently than the component which it replaced which may cause the new component to function differently than the previous component. The difference in functionality may be unintended and may cause improper system behavior. If the configurable component is a switch that interacts with various server computers ("servers") in a network environment, a security breach may occur as confidential information unintentionally may be provided to an incorrect server because a replacement switch may be configured incorrectly.

BRIEF SUMMARY

One or more of the issues noted above may be solved by methods and apparatus pertaining to a configurable device that is capable of multiple configurations depending on its location within a support structure. Some embodiments comprise a system that includes a configurable device located within a support structure and logic that is adapted to determine the location of the configurable device within the support structure and to inform the configurable device of its location. The configurable device may compare its location as informed by the logic to a previous location value stored in the configurable device. The configurable device may load a first configuration if the locations match or load a second configuration if the locations do not match.

In some embodiments, the configurable device may comprise a switch. As such, the switch may include control logic, a first memory location in which a first configuration is stored, a second memory location in which a second configuration is stored, and a third memory location in which a previous location value is stored. The control logic may receive a present location value from an external device that indicates the present location of the switch within a support structure. In response, the control logic may load the first or second configuration depending on whether the present location value matches the previous location value.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
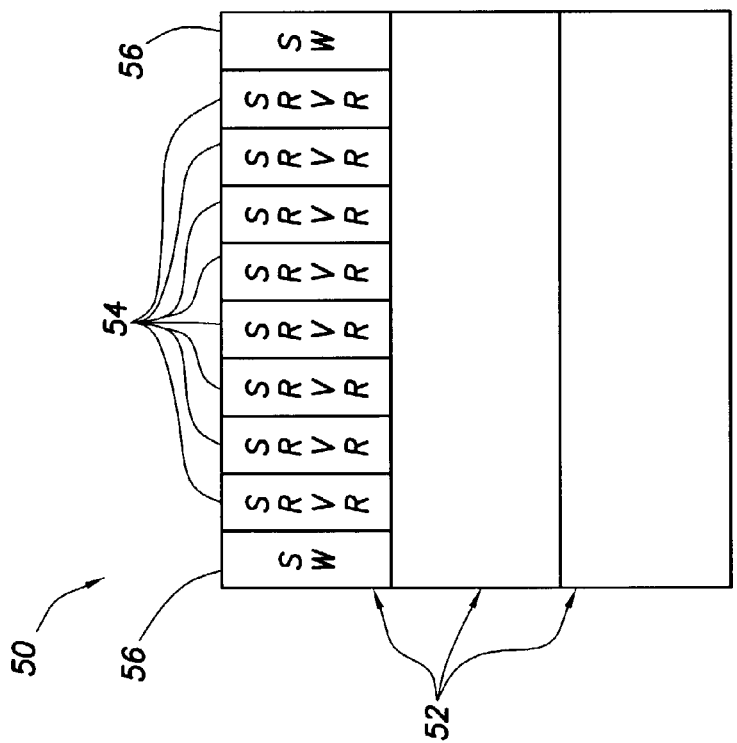
FIG. 1 shows a support structure containing an electronic system having at least one replaceable configurable component.

Referring now to FIG. 1, a support structure 50 is shown containing one or more chassis 52 in accordance with a preferred embodiment of the invention. Each chassis may include one or more electronic components that may interact to form a system. One of the chassis 52 is shown in FIG. 1 as containing one or more configurable components 54 and 56. In the example of FIG. 1, configurable components 54 may comprise servers and configurable components 56 may comprise switches. In other embodiments, other types of configurable components may be included such as routers, power supplies, etc. In general, the principles discussed herein may apply to any type of configurable electronic component. One of the chassis in FIG. 1 is shown as containing eight servers 54 and two switches 56, although the number of switches and servers can be varied as desired. Other chassis 52 may also contain servers and/or switches or other components including, without limitation, power supplies and storage devices.

Referring still to the example of FIG. 1, support structure 50 may comprise a rack or other type of support structure. In general, the support structure 50 may comprise any structure which is capable of accommodating one or more components, at least one of which is a configurable component. Each switch 56 or other configurable component may be removable from the support structure 50 and may be removed and inserted while other components in the support structure are powered on and operational (i.e., "hot" insertion and removal). The switch 56 may be provided in "blade" form to permit easy removal and insertion into a corresponding slot in the support structure 50. Similarly, the servers 54 may be implemented in blade form. In accordance with various embodiments of the invention, a physical location information value may be associated with each location (e.g., slot) within the support structure 50 in which a removable component may reside. The physical location information value may uniquely distinguish one location from all other locations within the support structure and may be implemented in any one of a variety of forms such as an integer.

Figure 2:
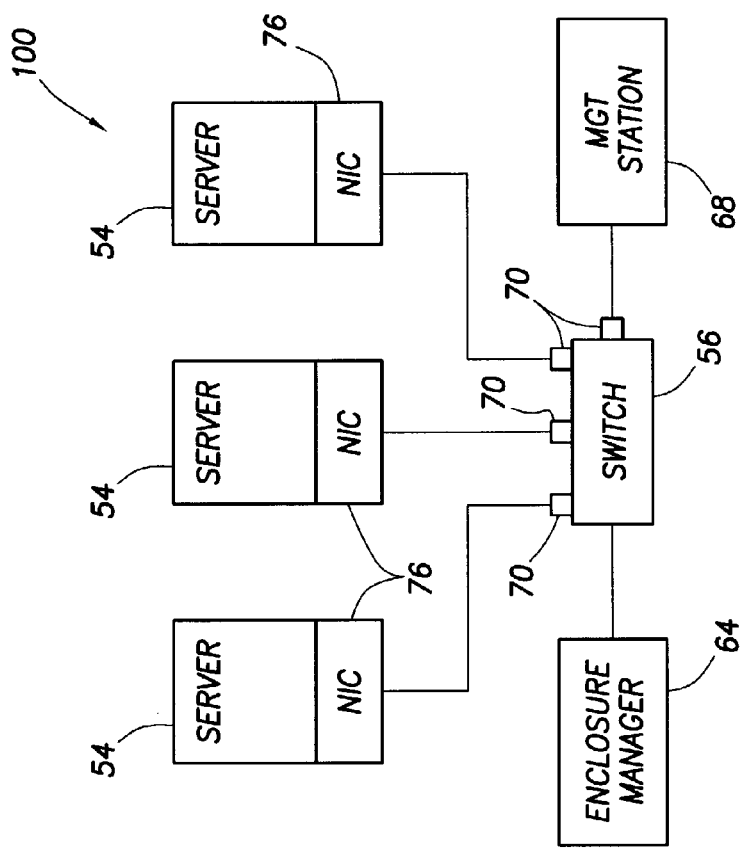
FIG. 2 shows a block diagram of the electronic system of FIG. 1 in accordance with embodiments of the invention.

Some of the components from FIG. 1 are shown in the electrical block diagram of FIG. 2. In FIG. 2 a system 100 is shown comprising one or more servers 54 coupled to a switch 56. An enclosure manager 64 and a management station 68 also may be coupled to the switch 56. Switch 56 may include one or more ports 70 each adapted to couple to another device such as a server 54, an enclosure manager 64 or management station 68 as shown.

Each server 54 may include at least a processor, memory and other components useful to execute software. The software may cause the server 54 to perform any one or more of a variety of functions and is generally specific to the tasks the server is designed to perform. Each server 54 may also include a network interface controller ("NIC") 76 to permit the server to communicate with other servers via the switch 56. In some embodiments, two or more switches 56 may be coupled together thereby permitting a server connected to one switch to be communicate with a server connected to another switch.

The enclosure manager 64 may perform one or more of a plurality of functions. One such function is to determine the physical location of a component within the support structure 50 and provide the location information as described below. The enclosure manager 64 may be implemented as an electronics module contained within the support structure 50. The enclosure manager 64 may be coupled to the switch via any suitable type of interconnect such as an I$^2$C bus. Information about an enclosure manager may be found in "Method and Apparatus for Operating a Server System", filed on Mar. 6, 2003, incorporated herein by reference.

The management station 68 also may couple to a port 70 on the switch 56 and, if desired, may be provided outside the confines of the support structure 50. The management station 68 may comprise a text terminal or a fully functional computer system having a processor, memory, input/output devices, etc. The management station 68 may be used to provide configuration information to the switch 56 or otherwise control the operation of the various configurable components within the support structure.

Figure 3:
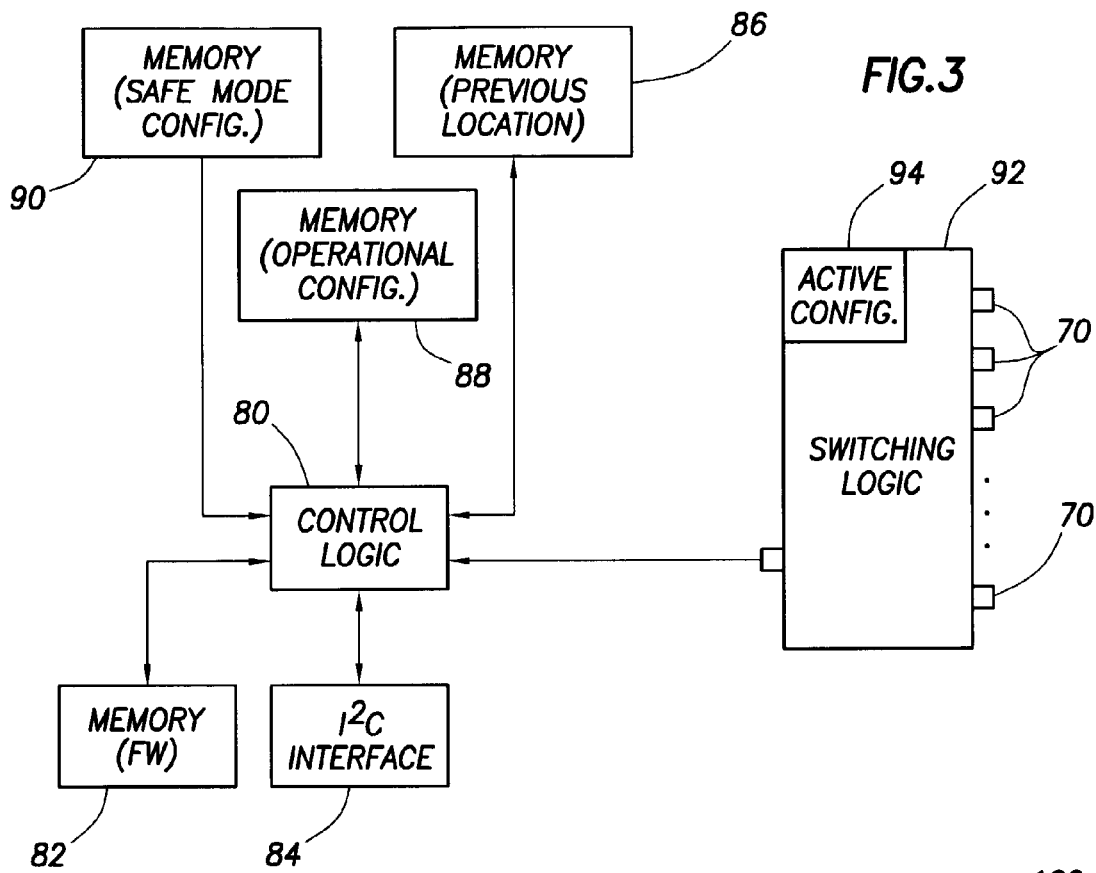
FIG. 3 shows a block diagram of a switch usable in the electronic system of FIGS. 1 and 2 in accordance with embodiments of the invention.

FIG. 3 shows an exemplary block diagram of a switch 56. As shown, the switch 56 may include control logic 80, memory 82, 86, 88 and 90, I$^2$C bus interface 84, and switching logic 92. Memories 82, 86, 88 and 90 may be provided as one or more memory devices and may simply refer to various memory locations within a storage device. Memory 82 may comprise non-volatile memory (e.g., electrically erasable read only memory) in which the switch's firmware may be stored. The firmware comprises executable code. The control logic 80 may comprise a processor that executes the firmware stored in memory device 82. The control logic 80 controls the overall operation of the switch as described herein.

Memory device 86 may comprise non-volatile memory, such as flash memory, and may be used to store the last known location information for the switch 56. That is, memory device 86 may include location information that indicates the location within the support structure 50 that the switch 56 previously occupied as determined at any suitable time such as when the switch 56 last initialized. Thus, if the switch 56 was included in the support structure at location X, memory 86 may contain a value that is indicative of location X. Because memory 86 may be implemented as non-volatile memory, the location X value (or value indicative of location X) is retained in the switch through a subsequent relocation of the switch and power cycle or initialization sequence. Each time the switch 56 performs a power cycle or re-initializes, the contents of memory 86 may inform the switch the previous location in the support structure 50 that the switch occupied.

In accordance with various embodiments of the invention, the switch 56 may be configured in accordance with either of at least two configurations. Memory devices 88 and 90 may comprise non-volatile memory, such as flash memory, and may be used to store these configurations. Memory 88 includes an "operational" configuration and memory 90 includes a "safe mode" configuration. The reference numeral 90 is used herein to refer to the memory 90 as well as the safe mode configuration. Similarly reference numerals 82, 88 and 86 may be used to refer to the memories/memory locations or the contents stored therein. The safe mode configuration 90 may include configuration information to cause the switch 56 to operate in such a way as to minimize or preclude any undesirable system behavior from occurring. In general, while in the safe mode, the switch 56 operates in a reduced functionality mode with respect to a fully operational mode. Without limitation, an example of a safe mode may be for only one port 70 to be enabled to permit the switch 56 to communicate with logic to reconfigure the switch. Such logic may include the management station 68 or one or more remote servers as will be discussed below. All other ports 70 may be disabled in accordance with the safe mode configuration to preclude communications to/from servers 54. In general, the safe mode configuration may be used when the switch 56 is placed into a location with the support structure 50 that differs from the switch's previous location. In this case, the previous configuration of the switch may not be suitable and thus the safe mode configuration is used to provide the switch with some capabilities in a way that should not result in any misrouted packets, security problems, and the like.

The operational configuration includes configuration information that is different from the safe mode configuration information. In general, the operational configuration may include configuration information that causes the switch 56 to be fully operational. For example, all ports 70 may be enabled that are coupled to operational servers 54.

The switching logic 92 generally causes packets of information received on a port 70 to be routed out through another port 70 in accordance with the active configuration 94 stored in memory in the switching logic. The active configuration 94 thus controls the operation (e.g., the routing behavior) of the switch 56. The active configuration 94 may comprise the operational configuration or the safe mode configuration and is loaded by the control logic 80 from either memory 88 or 90 depending on the location of the switch 56 vis-à-vis its previous location.

In accordance with various embodiments of the invention, at least some locations within the support structure 50 are adapted to accept configurable components (e.g., switches 56). Such locations may be configurable either as a safe mode location or a non-safe mode location. Thus, the enclosure manager 64 or management station 68 may configure each possible switch location for either safe mode or non-safe mode operation. This safe mode enabled configuration item may be transferred to the switch by the enclosure manager 64 with the current location information previously described. A switch location configured for use in the safe mode means that, in certain situations, a switch located therein may be configured for operation in the safe mode. A switch location configured as a non-safe mode location means that a switch located therein may not be configured into the safe mode.

The following may describe what happens when a switch 56 initializes or performs a power cycle. Referring to FIG. 3, during initialization, the present location of the switch 56 may be provided to the switch via any suitable device. For example, this location information may be provided by the enclosure manager 64 via the I²C interface 84. The control logic 80 may compare the switch's present location to its previous location (i.e., the location the switch occupied during its last initialization sequence) retrieved from memory 86. If the two locations match, the control logic 80 may load the previously used configuration into the switching logic's active configuration 94 for use by the switch. The previously used configuration may comprise the operational configuration 88. In general, the switch may be configured to operate however it was configured the last time the switch was configured for operation.

If, however, a mismatch exists between the present location of the switch and its previous location 86, the switch 56 may currently occupy a different location within the support structure 50 from the location occupied by the switch during its last initialization sequence (i.e., when memory 86 was previously written). In this case, the control logic 80 may load the safe mode configuration 90 into the active configuration 94. If configurable safe mode detection is implemented, and the location is not configured for safe mode operation, and a location mismatch is detected, the control logic 80 may load the previously used configuration into the switching logic's active configuration 94 for use by the switch. The reason for loading the safe mode configuration 90 as the active configuration should not be used to limit the scope of this disclosure. However, by determining that the switch is located in a different place within the support structure 50, the previous configuration may not permit the switch to operate properly. By initializing the switch 56 to a safe mode, the switch may not be permitted to operate fully, but it will operate safely (e.g., not misroute packets). In accordance with at least some embodiments of the invention, the safe mode configuration may be stored in memory 90 before the initialization process occurs as described above. Also, the control logic updates memory 86 with the new location of the switch 56.

Figure 4:
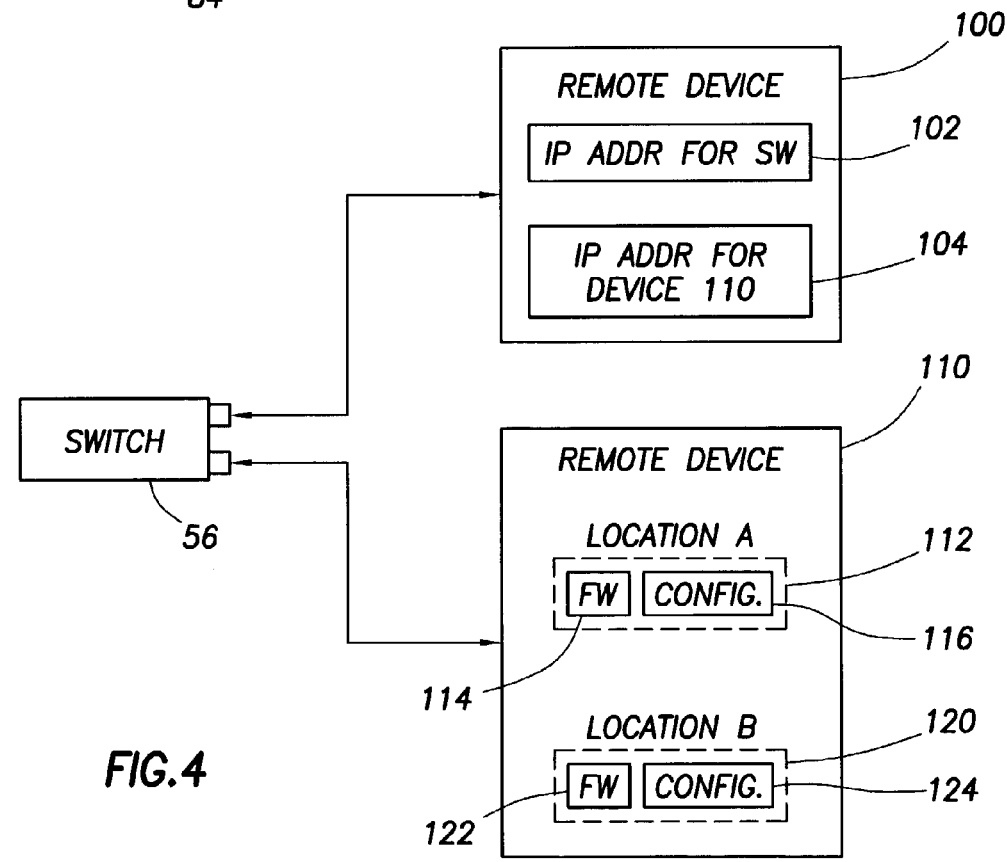
FIG. 4 illustrates an exemplary technique to provide the switch with a new Internet Protocol ("IP") address, firmware and configuration information.

After the switch 56 exits the initialization sequence in its predetermined safe mode, the configuration of the switch 56 may be changed to an operational configuration. In some embodiments, the operational configuration may be provided to the switch 56 from a remote device such as the management station 68 or another server apart from system 100. This latter approach is illustrated in FIG. 4 in which a switch 56 is shown with a communication link to one or more remote devices 100 and 110. The remote devices 100, 110 may comprise any device capable of functioning as described herein. In at least some embodiments, the remote devices 100, 110 may comprise servers.

With the switch 56 having loaded a safe mode configuration 90 into the active configuration 94, the switch's active configuration then may be changed to a suitable operational configuration, but generally not the operational configuration already present in memory 88. This transition may be initiated by the switch 56 itself or by the remote device. The switch may transmit a message to the remote device 100 requesting an Internet Protocol ("IP") address 102, or the IP address along with a small subset of configuration information may have been obtained directly from the enclosure manager 64. Remote device 100 may provide IP address 102 to the switch 56 which is used as the switch's IP address. The remote device 100 also may provide the switch with an IP address 104 that may be the IP address of another remote device 110. With the IP address 104 of remote device 110, the switch 56 may communicate with the remote device 110 or the remote device 110 may communicate with the switch 56. In accordance with at least some embodiments, the remote device 110 may contain (e.g., in memory) switch information pertaining to one or more switches 56 or other types of configurable devices. Such information is depicted as information 112 and 120 which each may pertain to a switch 56. As shown, information 112 may include firmware 114 and configuration 116. Similarly, information 120 may include firmware 122 and configuration 124. The remotely provided configuration information 116, 124 may be loaded into a switch's memory 88 and active configuration 94 and used as the switch's operational configuration. The remotely provided configuration may be loaded in the active configuration from memory 88 by the control logic or the control logic 80 may cause the remotely provided configuration to be copied directly to both the memory 88 and the active configuration 94.

The remotely loaded configuration information may comprise a configuration that is suitable for the switch in its present location and thus may comprise a configuration used previously with a switch in the same location as the switch presently occupies. The firmware 114, 122 may be loaded into the switch's memory 82 and executed by the control logic 80. By including the ability to download new firmware into the switch 56, the firmware may be upgraded or changed to make the switch's operation commensurate with the newly downloaded configuration. The ability to provide configuration and/or firmware from a remote server may be implemented in the well known DHCP and TFTP servers or via other types of remote servers.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a configurable device located within a support structure; and
   logic adapted to determine the location of the configurable device within the support structure and to inform the configurable device of its location within the support structure;
   wherein the configurable device compares its location within the support structure as informed by said logic to a previous location value stored in the configurable device and loads a first configuration if the locations within the support structure match or loads a second configuration if the locations within the support structure do not match;
   wherein the first configuration comprises a fully operational configuration and the second configuration comprises a safe mode configuration which causes the configurable device to operate with less functionality than the fully operational configuration; and
   wherein the safe mode configuration permits only one communication link to another component to be active from the configurable device.

2. The system of claim 1 wherein the configurable device comprises a switch.

3. The system of claim 1 wherein such other component is adapted to provide a new configuration to the configurable device.

4. The system of claim 1 wherein the configurable device requests an IP address from a remote server and, once provided the requested IP address, the configurable device requests a new configuration from a server associated with the IP address.

5. A system, comprising:
- a switch located within a support structure and having memory into which configurations can be stored;
- a plurality of computers coupled to said switch and providing data to each other via the switch;
- an enclosure manager coupled to said switch and adapted to determine the location of the switch within the support structure and to inform the switch of the switch's location within the support structure;
- wherein the switch compares its location within the support structure as informed by the enclosure manager to a previous location value stored in the switch and loads an operational configuration if the locations within the support structure match or loads a safe mode configuration if the locations within the support structure do not match;
- the operational configuration permitting the switch to be operational and the safe mode configuration permitting the switch to be less operational than the operational configuration.

6. The system of claim 5 wherein, after loading the safe mode configuration, a remote device provides a new configuration to the switch.

7. The system of claim 6 wherein the new configuration overwrites the switch's operational configuration and the switch operates in accordance with the newly loaded operational configuration provided by the remote device.

8. The system of claim 6 wherein the switch includes memory in which firmware is stored and the remote device provides new executable firmware that is loaded into the switch in addition to the new configuration.

9. The system of claim 5 wherein the switch has a plurality of ports and, in accordance with the safe mode configuration, only a single port on the switch is enabled and all other ports are disabled.

10. A switch, comprising:
- control logic;
- a first memory location of a memory in which a first configuration is stored;
- a second memory location in which a second configuration is stored;
- a third memory location in which a previous location value, reflecting a previous location within a support structure, is stored; and
- said first through third memory locations are accessible by said control logic;
- wherein said control logic receives a present location value from an external device that indicates the present location of the switch within the support structure and the control logic loads the first or second configuration depending on whether the present location value matches the previous location value;
- wherein the first configuration comprises a fully operational configuration and the second configuration comprises a safe mode configuration which causes the switch to operate with less functionality than the fully operational configuration; and
- wherein the safe mode configuration permits only one communication link to another component to be active from the switch.

11. The switch of claim 10 wherein the control logic loads the fully operational configuration if the present location and previous location values match or loads the safe mode configuration if the present location and previous location values do not match.

12. The switch of claim 10 wherein, when the safe mode configuration is loaded, the control logic causes a message to be sent to a remote device to initiate a process whereby new configuration information is downloaded to the switch.

* * * * *